US011825892B2

(12) United States Patent
Megat Abdul Aziz et al.

(10) Patent No.: US 11,825,892 B2
(45) Date of Patent: *Nov. 28, 2023

(54) HIGHLY CHEMICAL RESISTANT GLOVE

(71) Applicant: Ansell Limited, Richmond (AU)

(72) Inventors: Putri Faridatul Akmar Binti Megat Abdul Aziz, Selangor (MY); Mei Yee Chin, Selangor (MY); Norazilayati Binti Rastam, Selangor (MY); Mohd Fairuz Bin Mohamad Zawawi, Selangor (MY); Hamidon Zain Bin Mohammed, Selangor (MY); Noorman Abu Hassan, Selangor (MY); Wan Ashruzi Bin Wan Ahmad, Selangor (MY)

(73) Assignee: Ansell Limited, Victoria (AU)

( * ) Notice: Subject to any disclaimer, the term of this patent is extended or adjusted under 35 U.S.C. 154(b) by 503 days.

This patent is subject to a terminal disclaimer.

(21) Appl. No.: 16/215,921

(22) Filed: Dec. 11, 2018

(65) Prior Publication Data
US 2019/0104781 A1 Apr. 11, 2019

Related U.S. Application Data

(63) Continuation of application No. 15/259,614, filed on Sep. 8, 2016, now Pat. No. 10,154,699.

(Continued)

(51) Int. Cl.
A61D 19/00 (2006.01)
A41D 19/04 (2006.01)
(Continued)

(52) U.S. Cl.
CPC ....... *A41D 19/0075* (2013.01); *A41D 19/001* (2013.01); *A41D 19/0082* (2013.01);
(Continued)

(58) Field of Classification Search
CPC .............. A41D 19/0075; A41D 19/001; A41D 19/0082; A41D 19/04; A62B 17/006
(Continued)

(56) References Cited

U.S. PATENT DOCUMENTS 4,190,685 A * 2/1980 Hart ........................ B29C 41/14
427/302
5,459,880 A * 10/1995 Sakaki .................... B29C 41/14
2/161.6
(Continued)

FOREIGN PATENT DOCUMENTS

CN 1486146 A 3/2004
CN 1812730 A 8/2006
(Continued)

OTHER PUBLICATIONS

International Search Report and Written Opinion dated Dec. 16, 2016 for PCT Application No. PCT/AU2016/000317.
(Continued)

Primary Examiner — Gloria M Hale
(74) Attorney, Agent, or Firm — Moser Taboada

(57) ABSTRACT

A chemical resistant composite glove that includes a first polymeric layer in the shape of a glove; and a second polymeric layer disposed on the first polymeric layer, and wherein the first polymeric layer is specified for one class of chemical resistance and the second polymeric layer is specified for a second class of chemical resistance, and optionally a third polymeric layer, which may be a thin coating, disposed on at least one of first polymeric layer or the second polymeric layer and is optionally specified for a third class of chemical resistance.

32 Claims, 5 Drawing Sheets

Related U.S. Application Data

(60) Provisional application No. 62/216,461, filed on Sep. 10, 2015.

(51) Int. Cl.
| | |
|---|---|
| *A62B 17/00* | (2006.01) |
| *A41D 19/00* | (2006.01) |
| *B29C 41/14* | (2006.01) |
| *B29C 41/22* | (2006.01) |
| *B29L 31/48* | (2006.01) |

(52) U.S. Cl.
CPC ............ *A41D 19/04* (2013.01); *A62B 17/006* (2013.01); *B29C 41/14* (2013.01); *B29C 41/22* (2013.01); *A41D 19/0006* (2013.01); *A41D 19/0058* (2013.01); *B29L 2031/4864* (2013.01)

(58) Field of Classification Search
USPC .......................................................... 2/161.6
See application file for complete search history.

(56) References Cited

U.S. PATENT DOCUMENTS

| | | | |
|---|---|---|---|
| 5,545,451 A * | 8/1996 | Haung | B29C 41/14 |
| | | | 2/159 |
| 6,021,524 A * | 2/2000 | Wu | A41D 19/0058 |
| | | | 2/161.7 |
| 6,347,408 B1 | 2/2002 | Yeh | |
| 6,391,409 B1 | 5/2002 | Yeh et al. | |
| 6,618,861 B2 | 9/2003 | Saks et al. | |
| 6,673,404 B1 | 1/2004 | Yeh et al. | |
| 6,913,758 B2 | 7/2005 | Hourihan et al. | |
| 7,771,644 B2 | 8/2010 | Flather et al. | |
| 8,522,363 B2 | 9/2013 | Hassan et al. | |
| 10,058,137 B2 * | 8/2018 | Megat Abdul Aziz | |
| | | | A41D 19/01547 |
| 10,154,699 B2 * | 12/2018 | Megat Abdul Aziz | |
| | | | B29C 41/22 |
| 10,405,593 B2 * | 9/2019 | Megat Abdul Aziz | |
| | | | A41D 19/01547 |
| 2003/0075828 A1 * | 4/2003 | Thomas | C08J 5/02 |
| | | | 264/308 |
| 2007/0118967 A1 * | 5/2007 | Flather | A41D 19/04 |
| | | | 2/159 |
| 2007/0157363 A1 | 7/2007 | Tao | |
| 2008/0306200 A1 | 12/2008 | Chen et al. | |
| 2009/0068443 A1 | 3/2009 | Curtet et al. | |
| 2010/0138978 A1 * | 6/2010 | Ikeda | D06N 3/183 |
| | | | 2/168 |
| 2010/0175164 A1 | 7/2010 | Foo | |
| 2011/0287553 A1 * | 11/2011 | Hassan | B32B 33/00 |
| | | | 156/60 |
| 2012/0011636 A1 | 1/2012 | Hansen et al. | |
| 2012/0047626 A1 * | 3/2012 | Johnson | A41D 19/0006 |
| | | | 2/161.6 |
| 2012/0090075 A1 | 4/2012 | Piesker et al. | |
| 2012/0096308 A1 * | 4/2012 | Yamagami | G06F 11/2074 |
| | | | 714/6.3 |
| 2012/0133507 A1 | 5/2012 | Bangera et al. | |
| 2014/0096308 A1 | 4/2014 | Holzner et al. | |
| 2014/0109917 A1 | 4/2014 | Nguyen et al. | |
| 2014/0115751 A1 * | 5/2014 | Saito | A41D 19/0065 |
| | | | 2/168 |
| 2015/0128329 A1 | 5/2015 | Amarasekera et al. | |
| 2015/0135403 A1 * | 5/2015 | Mercado | A41D 19/001 |
| | | | 2/164 |
| 2015/0143608 A1 * | 5/2015 | Loo | B29D 99/0067 |
| | | | 2/161.6 |
| 2015/0143610 A1 * | 5/2015 | Pimentel de Oliveira | |
| | | | A41D 19/01547 |
| | | | 2/167 |
| 2015/0272245 A1 | 10/2015 | Khor et al. | |
| 2016/0262469 A1 * | 9/2016 | Fernando | A41D 19/01505 |
| 2017/0071271 A1 * | 3/2017 | Megat Abdul Aziz | |
| | | | A41D 19/04 |
| 2017/0099889 A1 * | 4/2017 | Liou | C08F 236/12 |

FOREIGN PATENT DOCUMENTS

| | | |
|---|---|---|
| CN | 102754946 A | 10/2012 |
| CN | 103330309 A | 10/2013 |
| CN | 103443142 A | 12/2013 |
| EP | 1569702 A1 | 9/2005 |
| EP | 2121200 A2 | 11/2009 |
| EP | 2201852 A1 | 6/2010 |
| EP | 2441337 A1 | 4/2012 |
| WO | WO-2005/002375 A1 | 1/2005 |
| WO | WO-2014063415 A1 | 5/2014 |
| WO | WO-2017087797 A1 | 5/2017 |

OTHER PUBLICATIONS

Extended European Search Report on Application No. 16843296.1 dated Feb. 6, 2020.
European Search Report for Application No. EP 22 15 1953 dated Apr. 22, 2022, 4 pgs.
Encyclopaedia Britannica entry for nitrile rubber, downloaded from URL:https://www.britannica.com/technology/nitrile-rubber on Jun. 8, 2022, 2 pgs.
D.C. Blackley, "Latex-dipping processes", Polymer Latices, Science and Technology, Second edition, vol. 3, Chapter 17, Springer-Science+Business Medica, B.V., downloaded from https://doi.org/10.1007/978-94-011-5848-0_3, 94 pgs.

* cited by examiner

HIGHLY CHEMICAL RESISTANT GLOVE

CROSS-REFERENCE TO RELATED APPLICATIONS

This application is a continuation of U.S. application Ser. No. 15/259,614 filed Sep. 8, 2016, now U.S. Pat. No. 10,154,966, which claims the benefit of priority to U.S. provisional application No. 62/216,461, filed Sep. 10, 2015. The contents of each of the aforementioned patent applications are herein incorporated by reference in their entireties.

BACKGROUND

Field

The present application relates generally to gloves and more particularly to gloves having highly chemical resistant properties.

Description of the Related Art

Many workers wear gloves that provide protection from hazardous chemicals. For example, workers, and especially workers in industrial or laboratory settings, encounter many types of chemicals, e.g., acids, bases, hydroxides, aliphatic hydrocarbons, aromatic hydrocarbons, and/or aqueous or non-aqueous polar or non-polar solvents and/or solutions combining any or all of these chemicals, which may further contain hydrocarbons or have inorganic chemicals dissolved therein. However, no single polymeric barrier can protect against such an array of disparate chemicals and, furthermore, gloves optimized for chemical resistance are thick, inflexible, and often specified for one class of chemicals, e.g., non-polar hydrocarbons and, therefore, expense is added by having to re-glove often or double-glove when varied in-service applications are encountered. Moreover, workers also want thin, flexible, comfortable gloves for extended use so hands do not tire easily and/or to perform delicate tasks requiring dexterity. The flexibility of a glove is highly correlated with the thickness of the glove and increases according to the inverse of the cube of the thickness. Therefore, a reduction of the thickness of a polymeric glove by 30 percent increases the flexibility by a factor of three but commensurately decreases chemical resistance.

With the foregoing in view, the inventors herein provide composite polymeric gloves that are thin, soft, flexible, and highly chemically resistant to many classes of chemicals and methods for manufacturing the composite gloves.

SUMMARY

A composite polymeric glove, substantially as shown in and/or described in connection with at least one of the figures, as set forth more completely in the claims, are disclosed. Various advantages, aspects, and novel features of the present disclosure will be more fully understood from the following description and drawings.

The foregoing summary is not intended, and should not be contemplated, to describe each embodiment or every implementation of the present invention. The Detailed Description and exemplary embodiments therein more particularly exemplify the present invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

Figure 1:
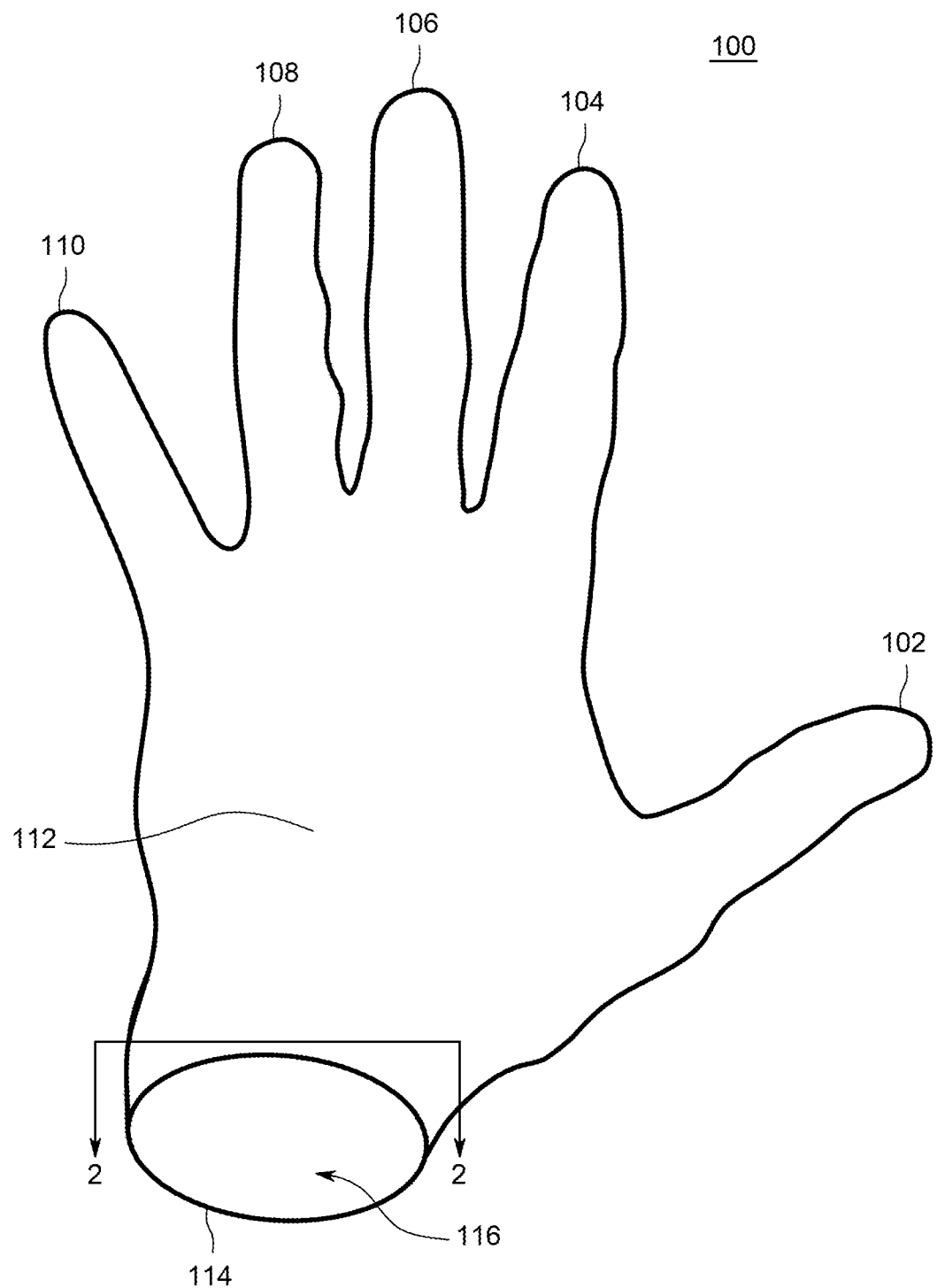
FIG. 1 depicts the palm side of a composite glove, according to embodiments of the invention.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments according to the invention comprise highly chemical resistant composite gloves, for example, a composite glove having a first polymeric layer and a second polymeric layer integrally formed therewith. At least one embodiment according to the invention comprises a highly chemical resistant composite glove having an internal (skin-contacting) polychloroprene layer integrally formed with an external nitrile layer wherein the composite gloves are thin, soft, flexible, and highly chemically resistant to many classes of chemicals, and methods for manufacturing the composite gloves. The polychloroprene layer provides softness and flexibility, which is at least one reason for having it as an internal layer, as well as chemical resistance for a first class of chemicals, e.g., organic and inorganic acids, alcohols, alkaline solutions, and oils. A nitrile-butadiene layer provides strength and chemical resistance to a second class of chemicals, e.g., weaker acids, such as acetic acid, hydrocarbons, such as heptanes, hexanes, toluene, and xylenes as well as various chemicals such as acetonitrile, acrylamides, carbon tetrachloride, chloroform, and salts and solutions and blends thereof. Also, an external layer comprising a nitrile-butadiene layer can be textured using salts, providing enhanced grip and durability properties. Additionally, the polychloroprene layer may have a thin coating, for example, made from a low total solids content composition, such as a polyurethane, polyacrylic, natural rubber, synthetic polyisoprene, or nitrile-butadiene material disposed as a thin coating, which is optionally disposed as a skin-contacting coating and which is soft because of its decreased thickness. Furthermore, the thin coating may offer chemical resistance to a third class of chemicals.

Embodiments of the invention further comprise a third polymeric layer, such as natural rubber or synthetic polyisoprene, disposed on the nitrile layer, producing a three layer glove, i.e., polychloroprene-nitrile-natural rubber or synthetic polyisoprene, from interior to exterior. A natural rubber or synthetic polyisoprene layer can provide chemical resistance against a third class of chemicals, such as, but not limited to, acetone, aldehydes, and some ketones. Also, exemplary embodiments according to the invention comprise a composite glove in which a polychloroprene layer is sandwiched between a thin nitrile layer (skin-contacting layer) and an external nitrile-butadiene layer.

Embodiments according to the invention further comprise a thin coating, which may be disposed on the two layer gloves or the three layer gloves described herein. The thin coating eases the stripping of the glove(s) from formers, particularly for glove(s) comprising one or more tacky polymers. The coating is stable and robust despite having a long pot life during manufacturing and is therefore inexpensive. The thin coating comprises, for example, a nitrile-butadiene composition, a natural rubber latex composition, or a synthetic polyisoprene composition, having a total solids content of approximately 18-20%. The thin coating is applied generally by a dipping process as is known to those in the art, which is typically disposed after a leaching step and before a curing step. In at least one exemplary embodiment of the invention, a chemical resistant composite glove comprises a thin nitrile-butadiene coating approximately 0.001-0.002" thick, disposed on a polychloroprene layer.

FIG. 1 depicts the palm side of a composite glove 100, according to embodiments of the invention. The composite glove comprises a thumb 102, an index finger 104, a middle finger 106, a ring finger 108, a little finger 110, a palm area 112 and, optionally, a beaded ring 114. An opening 116 is capable of receiving a hand for donning and doffing the composite glove 100. In some embodiments according to the invention, grip features can be disposed into the nitrile layer, as discussed further herein.

Figure 2:
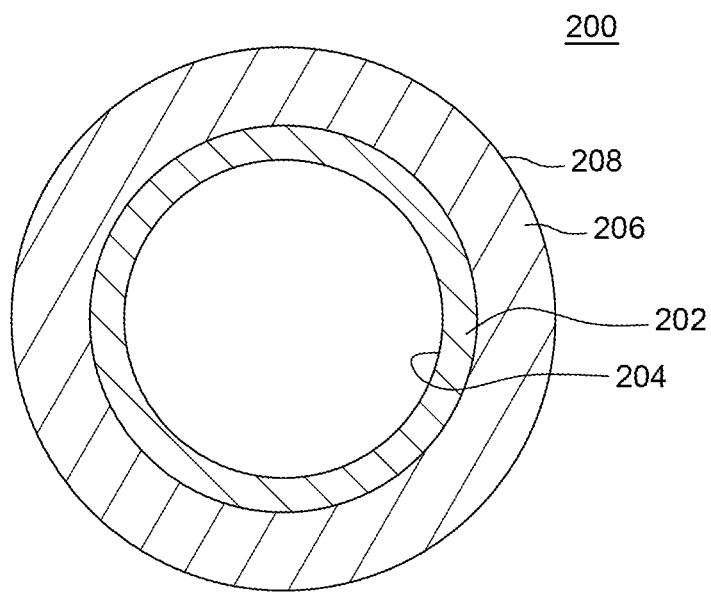
FIG. 2 depicts a cross section of the composite glove of FIG. 1 according to embodiments of the invention.

FIG. 2 depicts a cross section 200 of the composite glove 100 of FIG. 1, according to embodiments of the invention. The cross section 200 comprises a first polymeric layer 202, which comprises, for example, a polychloroprene polymeric material. The first polymeric layer 202 further comprises an interior surface 204, which is a skin-contacting surface, i.e., a donning side. The cross section 200 also shows a second polymeric layer 206 having an exterior surface 208, which is, for example, a nitrile-butadiene material and is a highly carboxylated nitrile-butadiene in embodiments according to the invention. Highly carboxylated, in this context, indicates approximately 30-40% carboxylation or greater. The first polymeric layer 202 and the second polymeric layer 206 are integrally formed, meaning that once formed together, the first polymeric layer 202 and the second polymeric layer 206 cannot be separated without destroying the composite glove 100, and have little or no gap therebetween. Embodiments of the invention comprise wherein the first polymeric layer 202 is thinner than the second polymeric layer 206. For example, at least one embodiment comprises wherein the first polymeric layer 202 comprises a thickness of approximately 0.0022" to 0.0045" and the second polymeric layer 206 comprises a thickness of approximately 0.0036" to 0.01".

Figure 3:
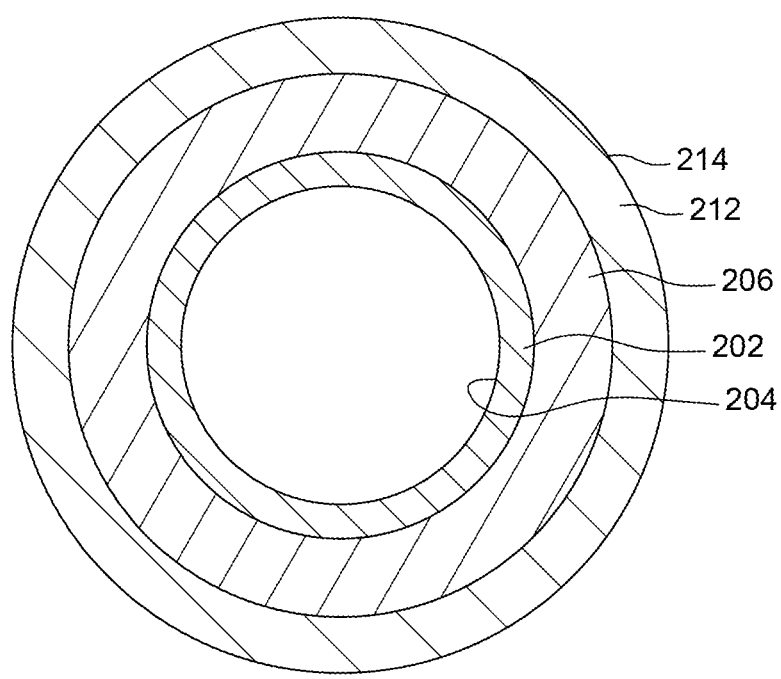
FIG. 3 depicts an alternative cross section of the composite glove of FIG. 1 according to embodiments of the invention.

FIG. 3 depicts an alternative cross section 300 of the composite glove 100 of FIG. 1 according to embodiments of the invention. The alternative cross section 300 depicts a third polymeric layer 212, having an exterior surface 214, disposed as an exterior layer on the second polymeric layer 206 of the cross section 200, as discussed above. Embodiments according to the invention comprise wherein the third polymeric layer 212 comprises, for example, a natural rubber latex (NRL) or a synthetic polyisoprene material. In at least one embodiment according to the invention, the third polymeric layer 212 comprises a thickness ranging between 0.003 to 0.01".

Also, in at least one embodiment according to the invention, the alternative cross section 300 depicts wherein a first polymeric layer 202, comprises a thin layer of a polymeric material, for example, wherein the first polymeric layer 202 is approximately 0.001" to 0.003' thick. The first polymeric layer 202 further comprises an interior surface 204, which is a skin-contacting surface, a second polymeric layer 206 of polychloroprene having a thickness of approximately 0.0025", and a third polymeric layer 212 of nitrile material having a thickness of approximately 0.004". Formulations according to embodiments of the invention for the first polymeric layer 202 and/or the second polymeric layer 206 are shown in Table 1, expressed in parts per hundred dry weight of rubber (PHR), and comprise, for example, polychloroprene and polyacrylonitrile-butadiene materials (NBR). Compositions C-E further comprise formulations for thin coatings, such as NBR, natural rubber (NRL), and synthetic polyisoprene (Synthetic PI), respectively and as discussed herein.

TABLE 1

| | (PHR) | | | | |
|---|---|---|---|---|---|
| Components | Composition A | Composition B | Composition C | Composition D | Composition E |
| Polychloroprene | 100 | — | — | — | — |
| NBR | — | 100 | 100 | — | — |
| NRL | — | — | — | 60 | — |
| Synthetic PI | — | — | — | — | 100 |
| Fillers | — | — | — | 25-35 | — |
| TiO$_2$ | — | — | — | 5 | — |
| Sulfur | 1.0 | 0.82 | 0.82 | 1.2 | 1.6 |
| Accelerator(s) | 1.5 | 1.5 | 1.5 | 1.0 | 0.9 |
| Activator (ZnO) | 5.0 | 1.6 | 1.6 | 1.0 | 0.7 |
| TSC (%) | 32 | 35 | 20 | 20 | 20 |

Figure 4:
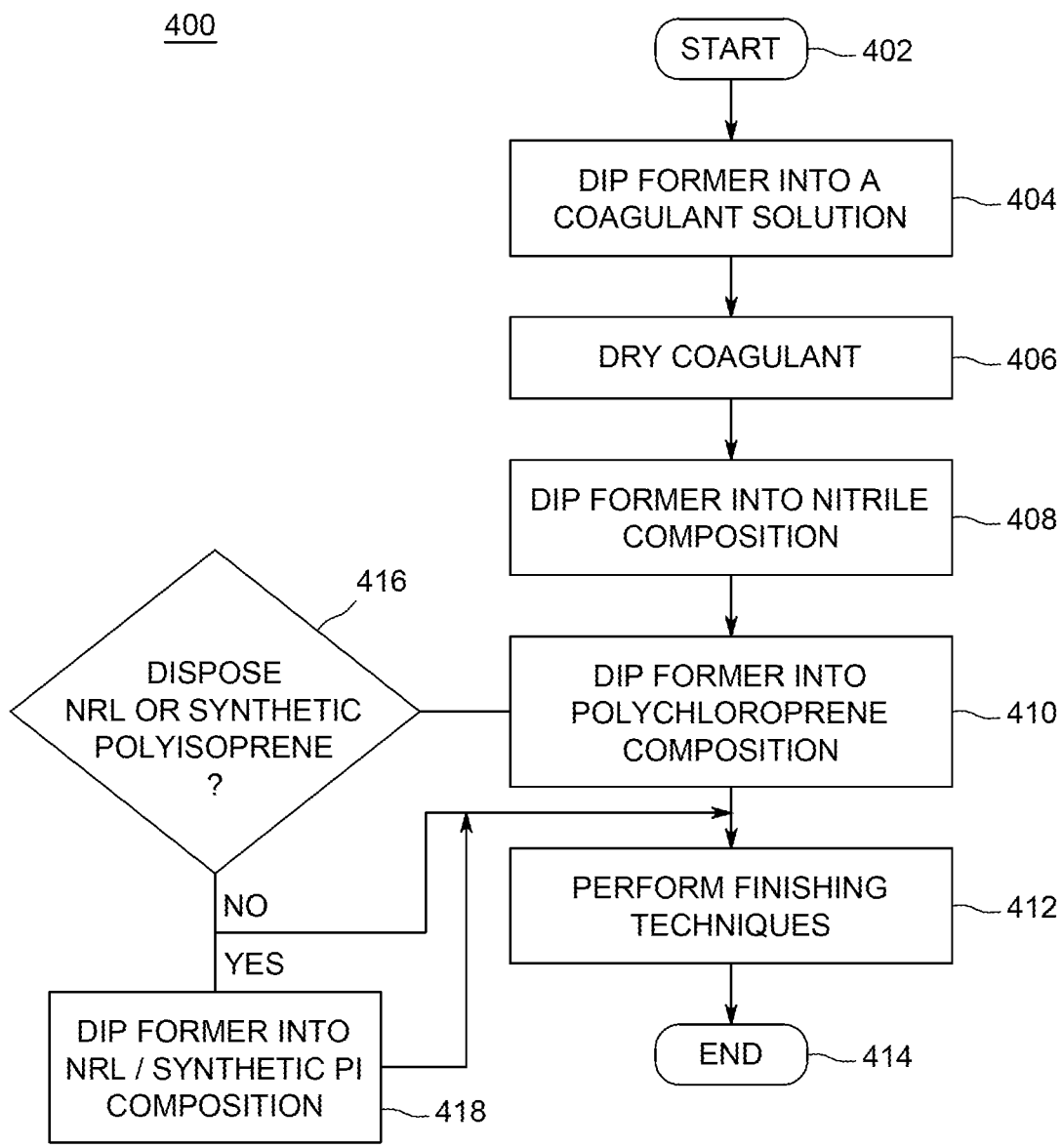
FIG. 4 depicts a flow diagram for methods of manufacturing composite gloves according to embodiments of the invention.

FIG. 4 depicts a flow diagram 400 for methods of manufacturing composite gloves according to embodiments of the invention. The method 400 starts at 402 and proceeds to 404, at which point a former has a coagulant solution applied thereto, such as by spraying or dipping into a coagulant solution. The coagulant solution may be a solution, for example, an aqueous or alcoholic solution comprising a concentration of 3-12% calcium citrate, calcium nitrate, calcium chloride, acetic acid, formic acid, and/or other salts and/or concentrations as are known to those in the art. At 406, the coagulant is allowed to dry as coagulant particles on the former.

At 408, the former having the coagulant applied thereto is dipped into a bath of a nitrile material composition, forming a nitrile layer thereon. At 410, the former is dipped into a polychloroprene material composition, disposing a layer of polychloroprene on the nitrile composition. The method 400 can then proceed to 412 for finishing techniques. The finishing techniques 412 comprise, for example, allowing the first layer, the second layer, and/or the third layer to dry, leaching the first layer, the second layer, and/or the third layer with, for example, water, to remove proteins and impurities, beading the first layer, the second layer, and/or the third layer (as discussed below) to form a cuff, curing the first layer, the second layer, and/or the third layer at, for example, 100-135 degrees Celsius for 15 minutes in an oven to form the composite glove.

Alternatively, the method 400, following 410, may proceed to 416, where a decision is made to dispose a third polymeric layer to form a three layer composite glove. If the answer is no, the method 400 proceeds to 412 as discussed above. If the answer is yes, the method 400 proceeds to 418, where the former is dipped into a tank having a natural rubber latex composition, a synthetic polyisoprene composition, a nitrile-butadiene composition, or a blend composition thereof and subsequently proceeds to 412 for finishing techniques. Embodiments according to the invention may further comprise chlorinating the glove or adding a coating, such as a polyurethane, polyacrylic, or polyacrylonitrile-butadiene coating on an exterior surface of the glove during manufacturing. It is to be understood that the disposition of a thin coating, e.g., a polyurethane coating, a polyacrylic coating, or a thin nitrile coating, may be disposed on the composite glove before the curing process at 412, which aids in stripping. Finally, the composite glove may be stripped from the former, which inverts the composite glove.

Figure 5:
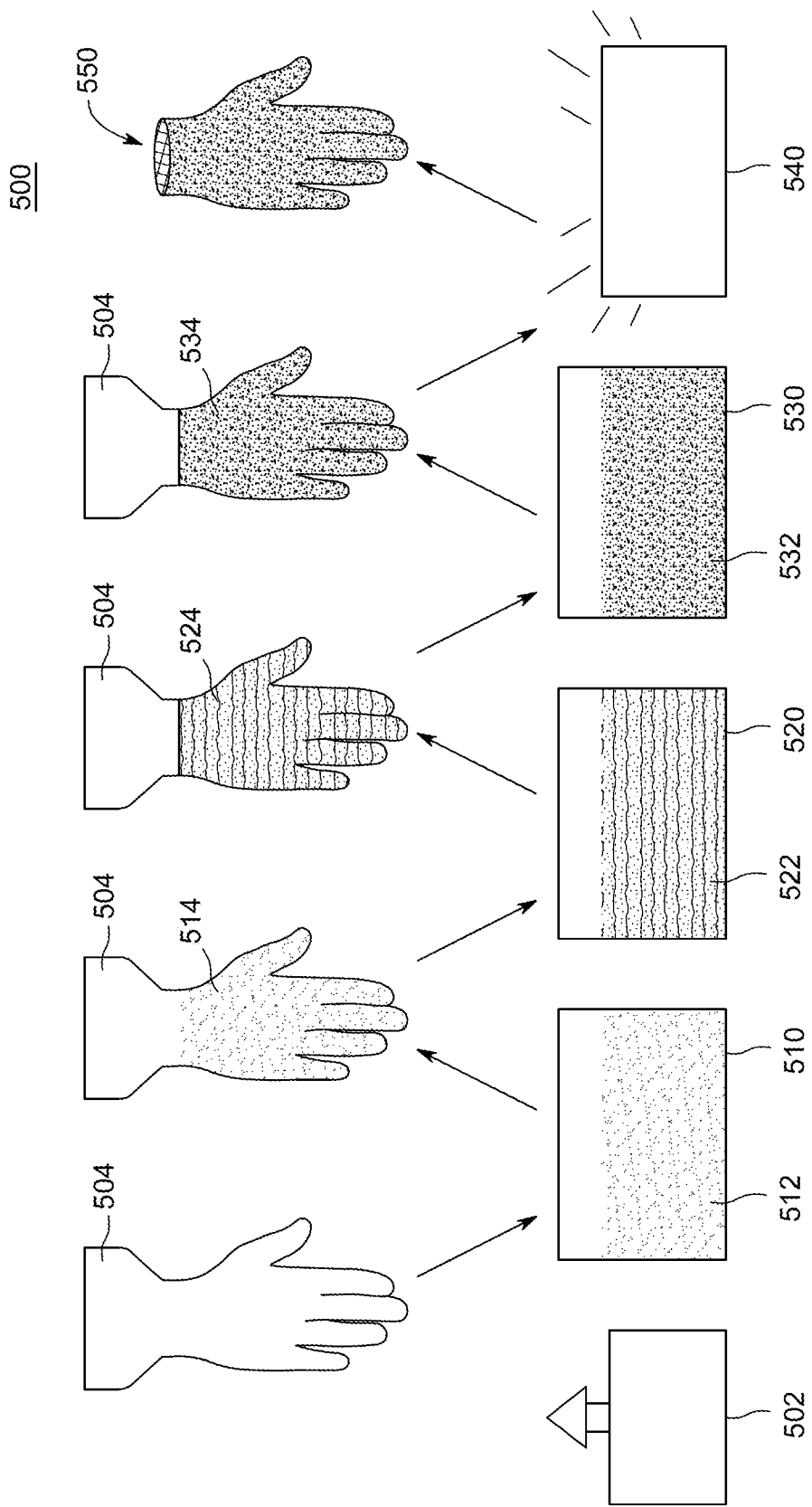
FIG. 5 depicts an apparatus used to manufacture the composite glove of FIG. 1, according to embodiments of the invention.

FIG. 5 depicts an apparatus 500 used to manufacture the composite glove of FIG. 1, according to embodiments of the invention. The apparatus 500 comprises a controller 502, which controls, for example, production line equipment, such as electronic circuits for controlling robots that deliver glove formers 504 to tanks 510, 520, 530, and an oven 540. A former 504 is provided. The former 504 is dipped into a tank 510 containing a coagulant 512, such as the aqueous or alcoholic (or aqueous/alcoholic mixture) coagulant as described herein, which becomes disposed on the former 504 as coagulant particles 514. The former 504 is optionally heated, for example, pre-heated to approximately 50-70° C., before dipping into the coagulant tank 510. In either case, pre-heated or unheated, the former 504 having the coagulant 512 disposed is removed from the coagulant tank 510 and allowed to dry. Some embodiments of the invention comprise removing some of the coagulant using a dipping step into water (as discussed further below), which may be used, for example, to limit the amount of polymeric composition (discussed below) disposed on the former 504 in subsequent steps.

The former 504 having the coagulant particles 512 disposed thereon is then dipped into a tank 520, containing a first polymeric composition 522, such as a nitrile material and is removed therefrom. The former 504 now has an uncured first composition disposed thereon as a first layer 524.

The former 504 is then delivered to a tank 530 containing a second polymeric composition 532, such as a polychloroprene material, which is disposed as an uncured polymeric layer 534 on the uncured first polymeric layer 524 discussed above. Optionally, the former 504 is dipped into a water tank, in which the uncured first polymeric layer 524 and/or second polymer layer 534 is leached of impurities and/or proteins. The former 504 is then delivered to an oven 540, wherein the first polymeric layer 524 and second polymeric layer 534 are cured with heat, as discussed above, to form a composite glove. The curing can be accomplished in two or more stages of varied temperatures and/or time periods, as discussed above. A composite glove 550 (or the composite glove 100, for example, discussed above) is then stripped from the former 504, and is optionally inverted, i.e., turned inside out. As above, if a third polymeric layer, such as an additional nitrile-butadiene layer, or, for example, a thin coating, such as a thin nitrile-butadiene coating, a thin natural rubber latex (NRL) coating, a thin synthetic polyisoprene coating, a thin polyacrylic coating, or a thin polyurethane coating, is added, it may be added before or following the curing process.

Figure 6:
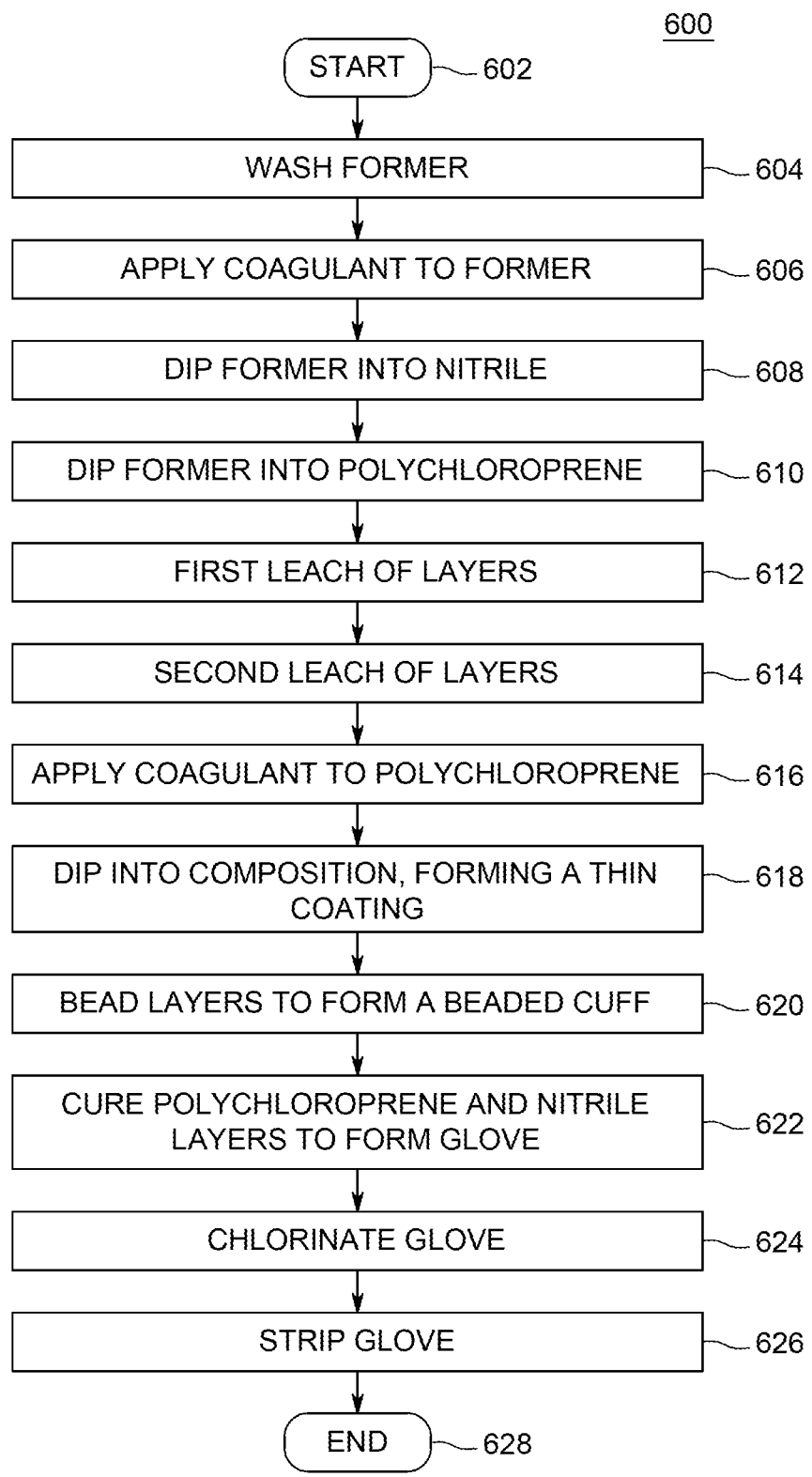
FIG. 6 depicts a flow diagram for a second method for manufacturing composite gloves, according to embodiments of the invention.

FIG. 6 depicts a flow diagram 600 for a second method for manufacturing composite gloves, according to embodiments of the invention. The method 600 starts at 602 and proceeds to 604, at which point a former is washed, which is optional. At 606, a coagulant is applied on the former, such as by spraying or dipping into a coagulant solution, and is allowed to dry as coagulant particles on the former. At 608, the former having the coagulant applied thereto is dipped into a bath of a nitrile material composition, forming a nitrile layer thereon. At 610, the former is dipped into a polychloroprene material composition, disposing a layer of polychloroprene on the nitrile composition.

The method 600 proceeds to 612 for leaching, for example, washing the former and nitrile/polychloroprene layers in hot water, to remove proteins and impurities therefrom. The method 600 proceeds to a second leaching operation at 614. At 616, the former having the polychloroprene layer disposed on the nitrile layer is dipped into a second coagulant bath, for example, a weak coagulant solution. In some embodiments according to the invention, the weak coagulant solution comprises, for example, an aqueous solution of approximately 2% calcium nitrate. At 618, the former is dipped into a polymeric composition having a low TSC for forming a thin coating, for example, a polyacrylic, a polyurethane, an NRL, a synthetic PI, or a nitrile-butadiene composition, forming a thin coating on the polychloroprene layer. The viscosity of the low TSC compositions are generally lower, for example, between 3-10 cps and are dipped at approximately 28-38° C. Without intending to be bound by theory, it is believed that the weak coagulant solution allows for a thin coating to be disposed on polychloroprene layer. In at least one embodiment according to the invention, the thin coating is a nitrile-butadiene layer that is approximately 0.001" to 0.003" in thickness and it at least one embodiment, approximately 0.001" to 0.00225". The nitrile-butadiene composition may be the same composition or a different nitrile-butadiene composition than that at 608. In some embodiments, the nitrile-butadiene composition at 618 has a total solids content (TSC), for example, 18-20% TSC, that is lower than the nitrile composition at 608, for example, generally 30-45% TSC, so that a thinner nitrile-butadiene coating may be disposed on the polychloroprene layer.

The method 600 proceeds to 620, wherein the nitrile and polychloroprene layers are beaded to form a cuff. At 622, the nitrile and polychloroprene layers are then cured at, for example, 100-135 degrees Celsius for 15 minutes in an oven to form the composite glove. At 624, the composite glove may be chlorinated. At 626, the composite glove may be stripped from the former, which inverts the glove and, therefore, the thin nitrile layer becomes a skin-contacting layer. At 628, the method 600 ends. It is to be understood that if a salt-texturization process is used to texture, for example, the fingertips, it is typically performed following the curing operation at 622, although it may be accomplished before 622.

Optionally, embodiments according to the invention further comprise texturization on surfaces of gloves. For example, methods and technologies described in U.S. Pat. Nos. 7,771,644 and 8,522,363, wherein salt is impregnated into a tacky layer of nitrile, which coagulates the nitrile molecules, and the salt is later dissolved with a solvent to leave multi-faceted cavities/indentations on and within a surface of the nitrile, the entire disclosures of which are commonly assigned and incorporated by reference in entirety. Also, embodiments according to the invention further comprise an external nitrile layer that is texturized using a textured former. In some embodiments, the textured former comprises, for example, a ceramic former having cavities disposed within a surface of the former. The cavities comprise a mean roughness depth of approximately 25-50 micrometers and may be as deep as 75 micrometers in depth. Moreover, the former may comprise peaks, which impart cavities onto a glove made therewith. In some embodiments, only the thumb and/or fingertips and/or palm areas are textured.

Optionally, methods according to embodiments of the invention include wherein the curing of the polymeric layers by heating the non-foamed polymeric, elastomeric, or latex coating and the foamed coating at a first temperature and a second curing step at a second temperature, wherein the second temperature is higher than the first temperature. Furthermore, optionally, methods include wherein curing processes include heating the first polymeric layer and the second layer in gradients, for example, 50-90° C. for 5-10 minutes and 90-135° C. for 20 to 90 minutes.

Any embodiments according to the invention herein also comprise the disposition of a third polymeric layer as an exterior layer. The third polymeric layer can be, for example, natural rubber latex (including Guayule latex), or synthetic rubber, i.e., synthetic polyisoprene. The synthetic polyisoprene may be a blend, for example, a blend of synthetic polyisoprene and polychloroprene, acrylonitrile butadiene copolymer polyurethane, styrene-butadiene, butyl, and/or combinations thereof. Also, any method for texturization of any nitrile layer may be used with any embodiment of the invention herein.

Embodiments of the invention comprise composite gloves that include a first polymeric layer in the shape of a glove and a second polymeric layer integrally formed with the first polymeric layer, wherein the first polymeric layer is specified for one class of chemical resistance and the second polymeric layer is specified for a second class of chemical resistance. Optionally, gloves according to embodiments of the invention comprise a third layer integrally formed with at least one of the first polymeric layer or the second polymeric layer and is specified for a third class of chemical resistance. The embodiments according to the invention described herein comprise a multi-layer polymeric glove, i.e., two or three or more integrally formed polymeric layers and methods of forming the composite glove(s).

Embodiments according to the invention include highly chemical resistant composite gloves. A highly chemical resistant glove may comprise a polychloroprene layer disposed on a nitrile-butadiene layer, or a layer of natural rubber latex or synthetic polyisoprene layer on a layer of polychloroprene and a layer of nitrile-butadiene, either or which may have a polyurethane or polyacrylic layer disposed thereon. For example, a highly chemical resistant glove may comprise an inner layer of polychloroprene, a middle layer of nitrile-butadiene, and an outer layer of natural rubber latex or synthetic polyisoprene. Alternatively, a highly chemical resistant glove may comprise an inner layer of polychloroprene, a middle layer of natural rubber latex or synthetic polyisoprene, and an outer layer of nitrile-butadiene, which may be texturized as discussed herein. Also, a highly chemical resistant glove may comprise an inner layer of natural rubber latex or synthetic polyisoprene, a middle layer of polychloroprene, and an outer layer of nitrile-butadiene. Any of the highly chemical resistant composite gloves may further comprise a thin layer of a polyacrylic material, a natural rubber composition, a synthetic polyisoprene material, or a polyurethane material disposed on the inner layer or the outer layer. Also, any of the composite gloves may comprise a thin layer of a nitrile-butadiene material disposed on the inner layer or the outer layer. At least one exemplary embodiment according to the invention comprises a highly chemical resistant glove having an inner layer of nitrile-butadiene layer, a middle layer of polychloroprene, and a thin coating comprising a low TSC nitrile-butadiene composition disposed on the polychloroprene layer.

At least one exemplary embodiment according to the invention comprises a method for manufacturing a highly chemical resistant glove via dipping a glove former into a nitrile-butadiene composition having a TSC of approximately 30-45%, forming a nitrile-butadiene layer thereon, dipping the former having the nitrile-butadiene layer into a polychloroprene composition having a TSC of approximately 30-40%, forming a polychloroprene layer thereon, and dipping the former into a low TSC polymeric composition, e.g., 18-20%, forming a thin coating thereon, wherein the thin coating comprises at least one of a polyacrylic material, a polyurethane material, a nitrile-butadiene material, a natural rubber, or a synthetic polyisoprene, and optionally inverting the glove to form a highly chemical resistant composite glove. At least one exemplary embodiment comprises a method for manufacturing a highly chemical resistant glove via dipping a glove former into a polychloroprene composition having a TSC of approximately 30-40%, forming a polychloroprene layer thereon, dipping the former having the polychloroprene layer into a nitrile-butadiene composition having a TSC of approximately 30-45%, and inverting the glove to form a highly chemical resistant composite glove, wherein the nitrile-butadiene layer is disposed as an internal, skin-contacting layer. At least one exemplary embodiment comprises a method for manufacturing a highly chemical resistant glove via dipping a glove former into a nitrile-butadiene composition having a TSC of approximately 30-45%, forming a nitrile-butadiene layer thereon, dipping the former having the nitrile-butadiene layer into a polychloroprene composition having a TSC of approximately 30-40%, and inverting the glove to form a highly chemical resistant composite glove, wherein the polychloroprene layer is disposed as an internal, skin-contacting layer for a soft feel.

Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

Publications and references, including but not limited to granted patents and published patent applications, cited in this specification are herein incorporated by reference in their entirety in the entire portion cited as if each individual publication or reference were specifically and individually indicated to be incorporated by reference herein as being fully set forth.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

What is claimed is:

1. A chemical resistant composite glove, comprising:
    a chemical resistant first polymeric layer in a shape of a glove comprising a nitrile-butadiene material; and
    a chemical resistant second polymeric layer in a shape of a glove comprising a polychloroprene material disposed on and integrally formed with the first polymeric layer, the glove configured so that the second polymeric layer is interior to the first polymeric layer, wherein the first polymeric layer is chemically resistant to at least one of heptane, acetonitrile, acrylamide, carbon tetrachloride, or chloroform, and wherein the second layer is chemically resistant to organic acids, inorganic acids, alcohols, alkaline solutions, and oils.

2. The chemical resistant composite glove of claim 1, comprising a third polymeric layer disposed on at least one of the first polymeric layer or the second polymeric layer.

3. The chemical resistant composite glove of claim 2, wherein the third polymeric layer comprises at least one of a polyacrylic material, a polyurethane material, a nitrile-butadiene material, a natural rubber, or a synthetic polyisoprene.

4. The chemical resistant composite glove of claim 1, comprising a polymeric coating, of approximately 0.001" to 0.003" in thickness, disposed on an interior surface of the second polymeric layer.

5. The chemical resistant composite glove of claim 4, wherein the polymeric coating is disposed with a composition having approximately 18-20% total solids content.

6. The chemical resistant composite glove of claim 4, wherein the polymeric coating comprises at least one of a polyacrylic material, a polyurethane material, a nitrile-butadiene material, a natural rubber, or a synthetic polyisoprene.

7. The chemical resistant composite glove of claim 4, wherein the polymeric coating is approximately 0.001" to 0.00225" in thickness.

8. The chemical resistant composite glove of claim 1, wherein the first polymeric layer comprises a textured surface having multi-faceted cavities.

9. A method for forming a chemical resistant composite glove of claim 1, comprising:
    coating a glove-sized portion of a hand shaped former with a coagulant;
    disposing the first polymeric layer on the coagulant coating;
    disposing the second polymeric layer onto the first polymeric layer; and
    curing the first polymeric layer and the second polymeric layer.

10. The method of claim 9, further comprising disposing a third polymeric layer on the second polymeric layer.

11. The method of claim 10, wherein the third polymeric layer comprises at least one of a polyacrylic material, a polyurethane material, a nitrile-butadiene material, a natural rubber, or a synthetic polyisoprene material.

12. The method of claim 10, wherein the third polymeric layer is disposed before curing the first and second polymeric layers.

13. The method of claim 10, wherein the third polymeric layer is disposed as a coating, of approximately 0.001" to 0.003" in thickness, of a polyacrylic material, a polyurethane material, a nitrile-butadiene material, a natural rubber, or a synthetic polyisoprene material.

14. The method of claim 13, wherein the third polymeric layer is disposed as a coating of a polyacrylic material, a polyurethane material, a nitrile-butadiene material, a natural rubber, or a synthetic polyisoprene material having a thickness of approximately 0.00225" in thickness.

15. The method of claim 13, wherein the third polymeric layer has a low total solids content of 18-20%.

16. The chemical resistant composite glove of claim 1, comprising a polymeric coating, of approximately 0.001" to 0.003" in thickness, comprising nitrile disposed on an interior surface of the second polymeric layer.

17. The chemical resistant composite glove of claim 16, wherein the second polymeric layer is thinner than the first polymeric layer.

18. The chemical resistant composite glove of claim 17, wherein the nitrile-butadiene of the first polymeric layer has approximately 30% carboxylation or greater.

19. The chemical resistant composite glove of claim 16, wherein the nitrile-butadiene of the first polymeric layer has approximately 30% carboxylation or greater.

20. The chemical resistant composite glove of claim 16, wherein the first polymeric layer comprises a textured surface having multi-faceted cavities.

21. The chemical resistant composite glove of claim 1, comprising a third polymeric layer disposed on the first polymeric layer and the second polymeric layer.

22. The chemical resistant composite glove of claim 20, further comprising a third polymeric layer disposed on the second polymeric layer.

23. The chemical resistant composite glove of claim 22, wherein the third polymeric layer comprises at least one of a polyacrylic material, a polyurethane material, a nitrile-butadiene material, a natural rubber, or a synthetic polyisoprene material.

24. The chemical resistant composite glove of claim 23, wherein the third polymeric layer is disposed as a coating, of approximately 0.001" to 0.003" in thickness.

25. A chemical resistant composite glove, comprising:
    a chemical resistant first layer in a shape of a glove comprising predominantly a nitrile-butadiene material;
    a chemical resistant second layer in a shape of a glove comprising polychloroprene and disposed on and integrally formed with the first layer, the glove configured so that the second layer is interior to the first layer, wherein the first layer is chemically resistant to at least one of heptane, acetonitrile, acrylamide, carbon tetrachloride, or chloroform; and wherein the second layer is chemically resistant to organic acids, inorganic acids, alcohols, alkaline solutions, and oils, and
    a third layer of a polymeric material comprising nitrile-butadiene disposed on and integrally formed with an interior surface of the second layer.

26. The chemical resistant composite glove of claim 25, wherein the third layer is disposed as a coating, of approximately 0.001" to 0.003" in thickness.

27. The chemical resistant composite glove of claim 26, wherein the first layer is thinner than the second layer.

28. The chemical resistant composite glove of claim 1, wherein the second polymeric layer is chemically resistant to a chemical selected from the group consisting of ethanol and oil.

29. The chemical resistant composite glove of claim 25, wherein the second layer is chemically resistant to a chemical selected from the group consisting of ethanol and oil.

30. The chemical resistant composite glove of claim 21, wherein the third polymeric layer comprises at least one of a polyacrylic material, a polyurethane material, a nitrile-butadiene material, a natural rubber or a synthetic polyisoprene material.

31. The chemical resistant composite glove of claim 1, further comprising a third polymeric layer that comprises at least one of a polyacrylic material, a polyurethane material, a nitrile-butadiene material, a natural rubber or a synthetic polyisoprene material.

32. The chemical resistant composite glove of claim 1, wherein the first polymeric layer is a nitrile-butadiene layer; and the second polymeric layer is a polychloroprene layer.

* * * * *